United States Patent Office 3,654,260
Patented Apr. 4, 1972

3,654,260
AZOBENZENE
Eishun Tsuchida, Tokyo, Japan, assignor to Asahi Kasei Kogyo Kabushiki Kaisha, Osaka, Japan
No Drawing. Filed Jan. 26, 1970, Ser. No. 5,994
Claims priority, application Japan, Feb. 3, 1969, 44/7,311
Int. Cl. C09b 27/00; C07c 107/06
U.S. Cl. 260—205  8 Claims

ABSTRACT OF THE DISCLOSURE

Process for preparing aromatic diamine azo compounds represented by the general formula $$NH_2-R-N=N-R-NH_2$$

wherein R is a member selected from the group consisting of a p-phenylene radical unsubstituted or substituted with lower alkyl radicals containing 1-3 carbon atoms; a p,p'-bis-phenylene radical unsubstituted or substituted on at least one of the nuclei with lower alkyl radicals containing 1-3 carbon atoms and a p,p'-methylene-bis-phenylene radical unsubstituted or substituted on at least one of the nuclei with lower alkyl radicals containing 1-3 carbon atoms which comprises reacting at least one aromatic diamine represented by the general formula $$NH_2-R-NH_2$$

where R is as defined above while feeding oxygen in the presence of a metal complex in which a transition metal ion is coordinated with an unsubstituted or alkyl-nuclear substituted pyridine and water (hydroxyl group) and or $C_1$-$C_3$ alkyl-substituted aniline.

BACKGROUND OF THE INVENTION

(1) Field of the invention

This invention relates to a process for preparing aromatic diamine azo compounds. More particularly, it is concerned with a process for preparing aromatic diamine azo compounds useful as intermediates for the compounds such as the dyes from aromatic diamines by means of an oxidative dimerization reaction.

(2) Description of the prior art

It is heretofore known that when p-phenylenediamine is reacted while feeding oxygen in the presence of a metal complex obtained by reacting a transition metal ion with a certain complexing reagent, dehydrogenative polymerization takes place to form a polymer of the type

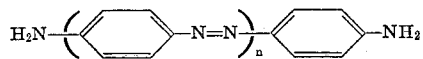

SUMMARY OF THE INVENTION

As a result of extensive investigations on the reactions of this type I have found: (1) The above-mentioned polymerization reaction can be controlled by application to the reaction of a metal complex in which a transition metal ion is coordinated with pyridine and a small amount of water and additionally in the presence of aniline in such a manner that the aromatic diamine azo compound having the aforementioned general formula in which $n=1$ can be produced in a considerably high yield and (2) said production of the diamine azo compound can be effected in a similar manner to the cases where other compounds analogous to p-phenylenediamine are used as the starting material in the presence of pyridine and aniline analogues.

Thus, the present invention relates to a process for preparing aromatic diamine azo compounds represented by the general formula $$H_2N-R-N=N-R-NH_2$$

which comprises reacting an aromatic diamine represented by the general formula $$H_2N-R-NH_2$$

in the presence of a metal complex in which a transition metal ion is coordinated with pyridine or a $C_1$-$C_3$ alkyl-nuclear substituted pyridine and water and aniline or a $C_1$-$C_3$ alkyl-nuclear substituted aniline. R in the above formula will be defined below.

The mechanism of the formation of the dimers by the co-existence of the specified metal complex and an aniline is not clearly elucidated, but is roughly presumed as follows: The polymerization of aromatic diamines of the above-mentioned general formula involves (a) complex formation by coordination of the aromatic diamine to the metal complex containing the transition metal ion in its high oxidation state at the center, (b) electron transfer from the aromatic diamine to the metal complex, which is then reduced to its low oxidation state, (c) release of the activated aromatic diamine from the metal complex, (d) coupling reaction of the activated aromatic diamines, (e) formation of a diazo bond from the polymerization product by dehydrogenative oxidation, and (f) oxidation of the metal complex containing the transition metal ion in its low oxidation state at the center to the one containing the transition metal ion in its high oxidation state at the center. In the above process aniline serves to control the polymerization by participation in the polymerization process through the reaction with the activated aromatic diamine. The use of the metal complex in which pyridine and water (hydroxyl group) are coordinated is presumed to serve the formation of the dimer in cooperation with the peculiar action of aniline as set forth above.

The aromatic diamines used in this invention are the compounds represented by the general formula $$H_2N-R-NH_2$$

wherein R represents a radical selected from the group of the following radicals:

p-phenylene 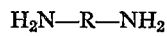

p-phenylenes substituted with lower alkyls containing 1-3 carbon atoms, p,p'-bis-phenylene 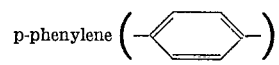

p,p'-bis-phenylenes substituted on at least one of the nuclei with lower alkyls containing 1-3 carbon atoms, p,p'-methylene-bis-phenylene 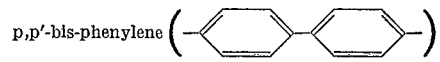

and p,p'-methylene-bis-phenylenes substituted on at least one of the nuclei with lower alkyls containing 1-3 carbon atoms. Representative of these compounds are p-phenylenediamine, 2,5-diaminotoluene, 1,2-dimethyl-3,5-diaminobenzene, benzidine, 2-methylbenzidine, 3,3'-dimethylbenzidine, 4,4'-diaminodiphenylmethane, 3,3'-dimethyl-4,4'-diaminodiphenylmethane, 2,2'-dimethyl-4,4'-diaminodiphenylmethane and the like.

These compounds are selected appropriately depending upon the desired product and, as understood by those skilled in the art, two or more of them may be simultaneously reacted.

As understood by the presumed reaction mechanism described above, the metal complex used in the process of this invention should be one in which the metal ion at the center is capable of cycling between its high and low oxidation states and which, in its high oxidation state, has a coordination site capable of additionally coordinating the amino group of the aromatic diamine as a ligand. The metal ions at the center include those of transition metals of atomic numbers 21–30, 39–48 and 57–80 and preferably used in this invention are ions of metals of Groups I, VI, VII and VIII in the Periodic Table, for example, such as ions of Cu, Ag, Au, Cr, Mo, W, Mn, Fe, Co, Ni, Ru, Rh, Pd, Os, Ir, Pt and the like. Especially preferred are Cu, Mo, Cr, W, Fe, Co and Ni. The metal complex may be prepared by mixing one of these metal ions, and water, but it is preferred to add the metal salt and water to pyridine used as a solvent to form a mixture to which the aromatic diamine and aniline are added either directly or in solution in pyridine or the like. As the pyridines are mentioned, in addition to pyridine, lower alkyl-substituted derivatives of pyridine having nucleus substituents consisting of lower alkyl radicals containing 1–3 carbon atoms such as α- and β-picolines, ethylpyridines and dimethylpyridines.

The amount of water, which depends upon the kind of metal salt selected, is preferably 10–100 moles per mole of the metal salt in the case where pyridine is used as the solvent. The larger the ratio of the metal complex to the aromatic diamine, the greater will be the tendency of the polymer of higher degree of polymerization to be formed and it is preferred to select a ratio of the metal complex to the aromatic diamine of 0.3 or below, and most preferably, 0.1 or below in order to increase the yield of the dimerized diamine azo compound.

As the anilines used together with the coordination catalyst are mentioned, in addition to aniline, lower alkyl derivatives of aniline having nucleus substituents consisting of lower alkyls containing 1–3 carbon atoms such as toluidines, xylidines, ethylaminobenzenes and propylaminobenzenes and the cheapest one, aniline itself, is preferably applied. As too large an excess amount of the aniline used will remarkably inhibit the reaction on the whole and too small an amount will reduce the yield of the dimer product, it is adequate to select a molar ratio of the aniline to the aromatic diamine in the reaction solution of 0.2–1.6, and preferably 0.5–1.2.

In carrying out the reaction any means suitable for the reaction between an aromatic diamine and oxygen in the presence of the above-described metal complex and aniline may be employed and batch or continuous procedures may be operated. Other solvents may be used unless they will participate in the reaction. Slightly elevated temperatures are suitable for the reaction because they increase the reaction rate as well as the yield of the dimer formed, and the reaction temperature is preferably 40° C. or higher, and most preferably 40° C.–100° C. The amount of oxygen bubbled, of course, should be selected corresponding to the reaction rate.

DESCRIPTION OF THE PREFERRED EMBODIMENTS

The present invention will be illustrated by the following examples:

Example 1.—In a reaction vessel equipped with means for measuring the amount of absorbed oxygen at constant temperature and pressure was placed a solution of 2.48 g. (0.025 mole) of cuprous chloride in a mixture of 700 ml. of pyridine and 20 ml. of water, which was thoroughly oxidized by bubbling oxygen therethrough. To the resulting solution was added dropwise a solution of 27.04 g. (0.25 mole) of p-phenylenediamine and 4.66 g. (0.05 mole) of aniline in 300 ml. of pyridine from a dropping funnel while vigorously stirring. After completion of the addition, the mixture was continued stirring under an atmosphere of oxygen at temperatures given below. Yields of 4,4′-diaminoazobenzene under the conditions of given reaction times and temperatures were:

| Reaction temperature (° C.) | Reaction time (hr.) | Yield (percent) |
| --- | --- | --- |
| 60 | 0.4 | 22.3 |
| 80 | 0.8 | 48.4 |
| 100 | 3.5 | 40.1 |

The reaction product was isolated by distilling off the pyridine under reduced pressure after completion of the reaction, extracting the residue with benzene, and concentrating the yellowish orange extract to give an orange solid, which was recrystallized from benzene and then from ethanol, M.P. 254–254.5° C., molecular weight found 216. IR spectrum and elementary analysis confirmed the dimer. The trimer and tetramer were extracted with acetone from the residue of benzene extraction but no higher polymers were extracted with acetone.

Example 2.—The procedures were repeated as in Example 1 using varied amounts of cuprous chloride and reaction times to conduct dimerization of p-phenylenediamine at a reaction temperature of 15° C. The results are as follows:

| Amount of cuprous chloride (mole) | Reaction time (hr.) | Yield (percent.) |
| --- | --- | --- |
| 0.0025 | 0.4 | 23.7 |
| 0.01 | 10 | 54.0 |
| 0.10 | 0.5 | 18.6 |

Example 3.—The procedures as in Example 1 were repeated except that 300 ml. of β-picoline were used in place of the pyridine and the reaction temperature was 70° C. to give a yield of p-phenylenediamine dimer of 28.3%.

Example 4.—The procedures as in Example 1 were repeated except that the amount of aniline added was increased to 0.75 moles and the reaction temperature was 15° C. to give a yield of p-phenylenediamine dimer of 19.3%. The yield, obtained under the same conditions and at 60° C. was 29.8%.

Example 5.—The procedures as in Example 1 were repeated except that 5.36 g. (0.05 mole) of p-toluidine were used in place of the aniline to give yields of p-phenylenediamine dimer of 20.1% when conducted at 15° C. and of 62.4% when conducted at 30° C.

Example 6.—A solution of 2.48 g. (0.025 mole) of cuprous chloride and 18.9 g. (0.02 mole) of iron alum in a mixture of 1000 ml. of pyridine and 20 ml. of water was thoroughly oxidized while bubbling oxygen therethrough. To the reaction vessel was added dropwise a solution of 27.04 g. (0.25 mole) of p-phenylenediamine and 22.30 g. (0.25 mole) of aniline in 500 ml. of pyridine from a dropping funnel while stirring vigorously. After completion of the addition, the resulting mass was stirred vigorously under an atmosphere of oxygen at 80° C. for 6 hours. The yield of 4,4′-diaminoazobenzene was 67.2%.

Example 7.—A solution of 18.9 g. (0.02 mole) of iron alum in a mixture of 700 ml. of pyridine and 50 ml. of water was thoroughly oxidized while bubbling oxygen therethrough. To the resulting mixture was added dropwise a solution of 27.04 g. (0.25 mole) of p-phenylenediamine and 23.30 g. (0.25 mole) of aniline in 300 ml. of pyridine while stirring vigorously and then the resulting mass was stirred vigorously under an atmosphere of oxygen at 78° C. for 4.5 hours. The yield of 4,4′-diaminoazobenzene was 44.0%.

Example 8.—The procedures as in Example 7 were repeated except that 1.98 g. of $MnCl_2 \cdot 4H_2O$ were used in place of the iron alum to effect the dimerization of p-phenylenediamine. The yield of 4,4′-diaminoazobenzene was 51.3%.

Example 9.—Dimerization of p-phenylenediamine was conducted by the procedures similar to those in Example 7 at 60° C. for 1 hour using the complex containing 0.025 mole of each of the following components in place of the iron alum. The yields of 4,4'-diaminobenzene are also given below.

| Component of the complex: | Yield (percent) |
|---|---|
| Manganese | 64.0 |
| Cobalt | 41.2 |
| Nickel | 37.6 |
| Molybdenum | 66.8 |

Example 10.—A solution of 2.48 g. (0.025 mole) of cuprous chloride in a mixture of 700 ml. of pyridine and 25 ml. of water was throughly oxidized while bubbling oxygen therethrough. To the above solution complex was added dropwise a solution of 23.3 g. (0.25 mole) of aniline and one of the anilines given below from a dropping funnel while stirring vigorously. After completion of the addition the resulting mass was continuously stirred vigorously at a temperature given below for a period of time given below. The yields of diamine azo compounds are also given below.

| Diamine (R) | Temperature (° C.) | Time (hr.) | Yield (percent) |
|---|---|---|---|
| 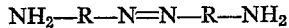 | 60 | 1.1 | 36.4 |
|  | 60 | 1.0 | 42.8 |
| -⟨⟩-⟨⟩- | 60 | 1.0 | 18.5 |
| -⟨⟩-⟨⟩- (CH₃) | 60 | 1.0 | 26.9 |
| -⟨⟩-CH₂-⟨⟩- | 60 | 1.0 | 22.1 |

I claim:
1. Process for preparing an aromatic diamine azo compound represented by the general formula

$$NH_2-R-N=N-R-NH_2$$

wherein R is a member selected from the group consisting of a p-phenylene group unsubstituted or substituted with a lower alkyl group containing 1-3 carbon atoms; a p,p'-bis-phenyl group unsubstituted or substituted on at least one of the nuclei with a lower alkyl group containing 1-3 carbon atoms and a p,p'-methylene-bis-phenylene group unsubstituted or substituted on at least one of the nuclei with a lower alkyl group containing 1-3 carbon atoms, which comprises reacting at a temperature of at least 40° C. at least one aromatic diamine represented by the general formula $$NH_2-R-NH_2$$

where R is as defined above while feeding oxygen in the presence of a metal complex in which a transition metal ion of a metal salt is coordinated with pyridine or a $C_1-C_3$ alkyl-nuclear substituted pyridine and from about 10 to about 100 moles of water per mole of said salt and aniline or $C_1-C_3$ alkyl-nuclear substituted aniline, the molar ratio of the aniline to the aromatic diamine being from about 0.2 to about 1.6 and the amount of said complex being not more than 0.3 mole per mole of the aromatic diamine.

2. Process according to claim 1 in which the transition metal ion is one selected from metals of Groups I, VI and VIII in the Periodic Table.

3. Process according to claim 1 in which the pyridine is selected from pyridine, α- and β-picolines, ethylpyridines and dimethylpyridines.

4. Process according to claim 1 in which the aniline is selected from aniline, toluidines, xylidines, ethylaminobenzenes and dimethylaminobenzenes.

5. Process according to claim 1 in which the amount of coordination complex of a transition metal ion is not more than 0.1 mole per mole of the aromatic diamine.

6. Process according to claim 1 in which the amount of aniline is 0.5–1.2 moles per mole of the aromatic diamine.

7. Process according to claim 1 wherein said metal ion is selected from the group consisting of copper, molybdenum, chromium, tungsten, iron, cobalt and nickel.

8. Process according to claim 1 in which the aromatic diamine represented by the general formula $$NH_2-R-NH_2$$

is selected from the group consisting of p-phenylenediamine, 2,5-diaminotoluene, 1,2-dimethyl-3,5-diaminobenzene, benzidine, 2-methylbenzidine, 3,3'-dimethylbenzidine, 4,4'-diaminodiphenylmethane, 3,3'-dimethyl-4,4'-diaminodiphenylmethane and 2,2'-dimethyl-4,4'-diaminodiphenylmethane.

References Cited

UNITED STATES PATENTS

| 3,345,356 | 10/1967 | Kmiecik | 260—205 X |
| 3,514,415 | 5/1970 | Karol | 260—571 X |

OTHER REFERENCES

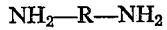

Houben-Weyl: Methoden Der Organischen Chemie, Band X/3, Georg Thieme Verlag: Stuttgart, 1965, pp. 373–374.

Terentiev & Mogiljanskij: Chemical Abstracts, 50, 4807e (1956), 53, 1327b (1959).

JOSEPH REBOLD, Primary Examiner
C. F. WARREN, Assistant Examiner

U.S. Cl. X.R.
260—578, 687